United States Patent [19]

Haythornthwaite

[11] Patent Number: 4,517,921
[45] Date of Patent: May 21, 1985

[54] ANIMAL REARING HOUSE

[76] Inventor: James A. Haythornthwaite, Willow Lodge, Church Rd., Warton, Preston, Lancashire PR4 1BD, England

[21] Appl. No.: 505,244

[22] Filed: Jun. 17, 1983

Related U.S. Application Data

[63] Continuation-in-part of Ser. No. 280,495, Jul. 6, 1981, abandoned, which is a continuation-in-part of Ser. No. 104,677, Dec. 17, 1979, abandoned.

[30] Foreign Application Priority Data

Dec. 16, 1978 [GB] United Kingdom .............. 48938/78

[51] Int. Cl.$^3$ .............................................. A01K 1/00
[52] U.S. Cl. ..................................................... 119/16
[58] Field of Search ................................... 119/15–20, 119/22, 28, 21, 31, 33

[56] References Cited

U.S. PATENT DOCUMENTS

| | | | |
|---|---|---|---|
| 3,915,377 | 10/1975 | Sutton, Jr. | 119/21 X |
| 4,013,044 | 3/1977 | Shaw | 119/16 |
| 4,173,947 | 11/1979 | Whiteside | 119/16 |
| 4,205,627 | 6/1980 | Buchanan | 119/19 |

Primary Examiner—Hugh R. Chamblee
Attorney, Agent, or Firm—Fleit, Jacobson, Cohn & Price

[57] ABSTRACT

An animal rearing house comprising a floor, walls and a roof defining an enclosure of generally elongate plan, air permeable animal cages of rectangular plan disposed with their major axes transverse to the major axis of the house, and a 100% variable speed fan for directing a heated air stream through the house in the elongate direction so that the air stream is transverse to the major axes of the cages.

6 Claims, 3 Drawing Figures

ANIMAL REARING HOUSE

This application is a continuation-in-part of U.S. patent application Ser. No. 280,495 filed July 6, 1981, now abandoned, which is a continuation-in-part of U.S. patent application Ser. No. 104,677 filed Dec. 17, 1979, now abandoned.

BACKGROUND OF THE INVENTION

This invention relates to an animal rearing house and more particularly, but not exclusively, a pig rearing house.

It is well established that in the rearing of animals for meat, animal growth is maximized under certain environmental conditions. Pigs in particular are extremely sensitive to temperature fluctuation and it is important when rearing pigs to keep them, if possible in conditions where the temperature of their surroundings can be controlled.

The normal way of keeping pigs in a controlled environment is to rear them in a building equipped with temperature control means. The high cost of building and the cost of controlling the environment therein makes it desirable that as many pigs as possible should be kept in a building of the smallest possible volume. The present invention has been made with this consideration in mind.

There have been many proposals for animal breeding houses having a controlled environment. The most recent such development comprises an elongate building having animal cages therein arranged in a continuous line along the length of the building, an air intake at one end of the building and an air extractor at the opposite end. With this arrangement, a single stream of air flows from one end of the building to the other. Although more successful than any other previous system it has become apparent that there are serious disadvantages. The large bulk of cages arranged to extend in parallel with the air stream actually cause an obstruction to the flow of air and consequently the majority of air, instead of flowing through the cages, is diverted through the passageways between the side walls of the building and the cages. As a result there is relatively small air flow through the center of the cases. In addition, due to the length of the house, by the time the air stream reaches the end, its temperature control effect is minimal. This results in the imprecise control of temperature and non-uniform conditions along the length and across the width of the house. Thus to effect control of temperature at the middle of the line of cages and at the downstream end of the line of cages requires a considerable throughput of air with consequent heavy energy requirements.

SUMMARY OF THE INVENTION

According to the invention there is provided an animal rearing house particularly for weaner pigs comprising a floor, side walls, end walls and a roof forming an elongate house. Other features include air intake baffles with an opening located underneath the central portion intermediate the ends of the house, preheat chambers for separating air from said air intake baffles into two streams, control circuitry for independently controlling the temperature of each air stream, a fan for directing the one air stream to one end of the house, a fan for directing the other air stream to the other end of the house, and movable, air permeable animal cages of substantially rectangular shape when viewed in plan, positioned in the house with their major axes transverse to the major axis of the house whereby said air streams flow through the house transverse to the major axes of the cages.

BRIEF DESCRIPTION OF THE DRAWINGS

A specific embodiment of the invention will now be described by way of example with reference to the accompanying drawings in which.

DETAILED DESCRIPTION OF THE DRAWINGS

Figure 1:
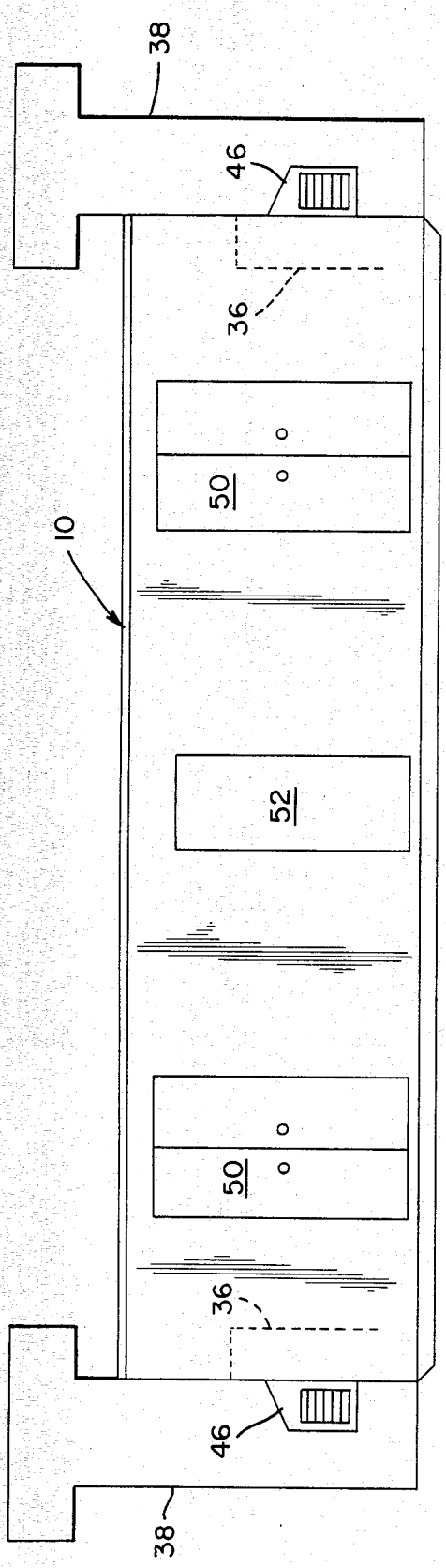
FIG. 1 is a side elevation of a pig rearing house.
Figure 2:
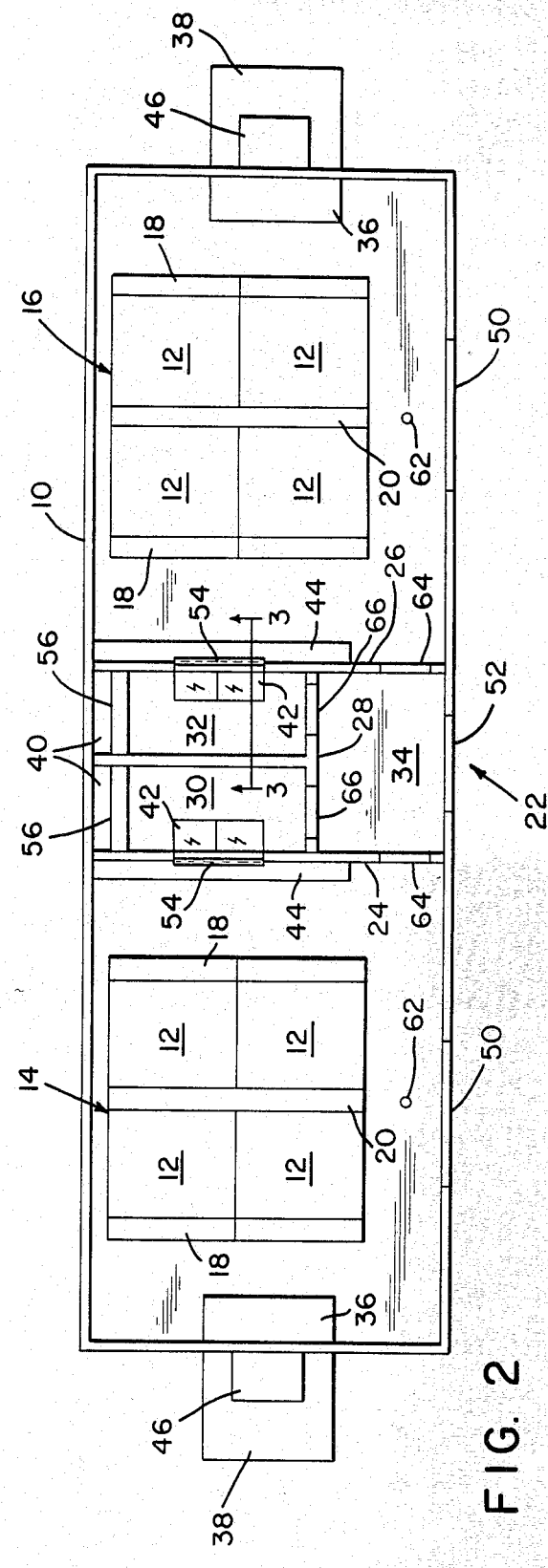
FIG. 2 is a plan view of the house of FIG. 1 with the roof and exhaust chimney flange omitted to show the interior layout.
Figure 3:
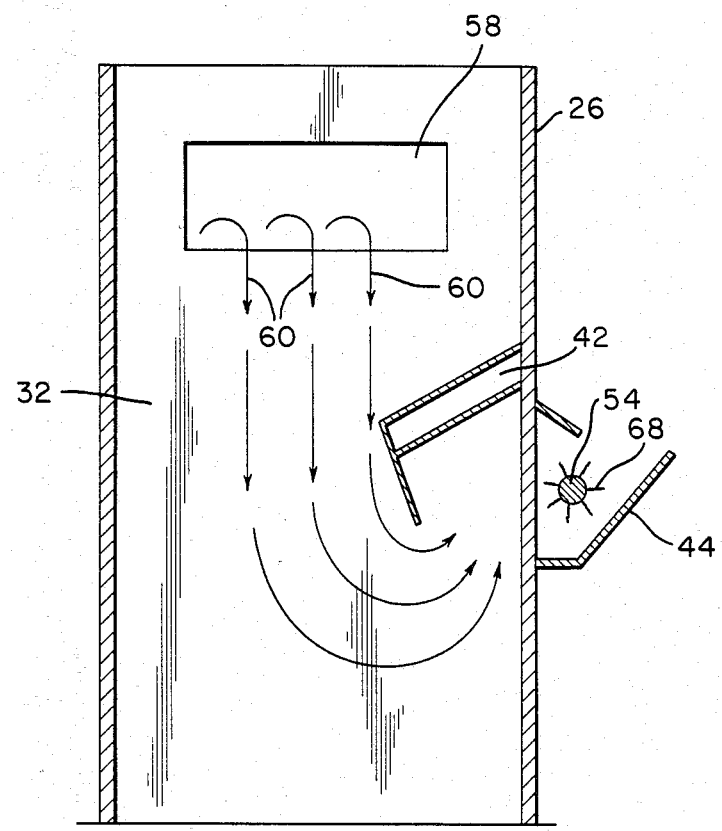
FIG. 3 is a sectional view along the line 3—3 of FIG. 2.

Referring to FIGS. 1 and 2 a rearing house 10 intended for weaner pigs is shown in rectangular plan. Pig cages 12 made of air permeable material such as wire mesh are arranged in two groups 14 and 16 with a plurality of cages in each group. Food troughs 18 are provided at each side of each group so that access to the cages is from the ends of the cages that are adjacent the long walls of the house. An additional trough 20 is provided parallel to troughs 18 through the middle of the group of cages to take surplus liquid and effluent. As can be seen in the drawing each group of cages is spaced from the walls of the house so as to allow access thereto.

An air intake and treatment area 22 is defined between the two groups of cages by partitions 24, 26 and 28. The area 22 is itself devided into sub-units 30 and 32 by a partition 28. The sub-unit 30 provides treated air for the adjacent group of cages 14 and sub-unit 32 does the same for the adjacent group of cages 16. Sub-unit 34, acts as an air-lock, and is used as a control room area separated from units 30 and 32 by partition 28. The operator stepping into chamber 34 through door 52 will not interfere with the operation of units 32 and 34, or let outside air affect the cage areas.

Each sub-unit 30 and 32 comprises a baffle 56 which slows the air down from intake 40 for drawing air therein from underneath the house and a propane gas heater 42 at the inlet of an air distribution baffle 44. Air is drawn through the intake 40, into chambers 30 and 32 through opening 58 as shown by arrows 60, through heater 42, finned supplemental heating rod 54, and air distribution baffle 44 of each unit, and across group of cages by an exhaust fan 46 mounted on each end wall of the house. Fans 46 are each located behind a baffle 36 located in an exhaust stack 38. The fans 46 are 100% variable speed fans of the type made by Zeil Arbegg. Air opening 58 may be of the dimensions of 8 inches by 22 to 24 inches.

The temperature in the house can be maintained within desired limits by electronic control means that switches the fans and heaters 46, 42 and 54 in response to temperature measurement by "golf ball" thermistors 62 hanging from the ceiling of the cage. Thermistors 62 should be placed between the cage end and the double door opening 50, suspended three to four feet from the ceiling. Securing of the thermistor should allow for its removal to avoid damage during washdown. The spacing from the cages is to prevent false readings from the coldness of the metal frames.

Thus, if the house is too cold the air stream entering the cage area is heated. Additional control is provided by varying the speed of the air streams or, in other words, varying the rate of air change drawn by the exhaust fans.

The cages 12 are preferably mounted, for example, on casters so as to be movable out of the house through doors 50 for cleaning and washing down. Removal of the cages allows high pressure washing of the building with water temperatures of approximately 150° F. This prolongs the useful life of the building by protecting against the harsh effects of waste buildup. A separate door 52 is provided for normal access to the chamber 34. Doors 64 allow access to the cages, while doors 66 allow access to pre-heat chambers 30 and 32.

The arrangement of cages and their construction is such that they are air permeable and do not present a significant obstruction to the air stream along the house. To that end, the cages are of rectangular plan and are arranged with their major axis transverse to the longitudinal axis of the house. Moreover the combined dimensons of the cages in the lengthwise direction of the house does not exceed, and is preferably less than the overall dimension of the cages in the widthwise direction of the house.

The arrangement just described provides accommodations intended for weaner pigs, i.e. pigs from seven to fourteen days old, up to about eight weeks old. The house can be made larger or smaller depending on requirements, although it is preferred not to exceed outer dimensions which can be accommodated on a vehicle if the house is to be transportable. If the house is made larger, then obviously more cages can be accommodated, but in accordance with the invention the orientation of the cages should still be transverse to the air flow in the house and they should not form a barrier to the air flow.

It is desirable to provide an alarm that will be triggered should a fan or heater fail. For example, a thermostat can be provided which, upon fan or heater failure, operates to trigger an alarm. The thermostat can also be used to open a ventilator (not shown) to permit flow of external unheated air through the house. This is particularly important in the case of fan failure, when the temperature within the house can increase rapidly to a level which is harmful to piglets.

It is of critical importance that a constant temperature be maintained within each of the chambers 30 and 32. This is necessary to provide an environment wherein the maximum size of the piglet may be obtained in the minimum time. A coarse adjustment of the temperature is provided by automatic adjustment of the propane gas heater 42 while fine changes are achieved by adjustment of heating rod 54. The fins 68 of heater 54 generate additional heat as required, while the air passes through the baffled air distributor 44. Both heaters are varied by a control circuit according to temperature inputs from thermistor 62.

Ideally, a constant temperature of 82° F. is maintained within the cage areas. If the temperature changes a maximum of 1° F., supplemental heater 54 will be activated to raise the air temperature passing into the pen area. The 100% variable fan 46 is activated to the speed required to cross ventilate the cages 12 to always provide fresh, warm, circulating air. Outside air is drawn through the bottom of the enclosure, as required for the high winds found in the United States. The amount of suction of the incoming air, caused by the variation of the speed of the fan, depends on the ambient temperature surrounding the pens. Air is drawn through the outside opening, through the entrance baffle, across the heaters and through groups 14 and 16 by the suction caused by the fan. Exhaust air is vented up and away, through the stack 38. At their youngest the piglet's air volume in the cage area is completely changed 12 to 13 times an hour.

As the piglets mature, the body heat they generate will raise the temperature of their enclosure. Table 1 illustrates how the propane gas thermostat setting is reduced as the age, weight and thus the temperature given off by the piglets increases.

As the piglets grow the differential between pig room thermostat setting and hot room setting will widen until the temperature of air entering the hot room is usually higher than that called for by the thermostat. At this point the gas burners will never switch in, except perhaps in the coldest part of the night.

A factor considered, when setting out the dimensions of the enclosure 10, was the ratio of air volume within a preheat chamber 30 or 32, compared to the air volume within one of the cage areas. Traditionally, the ratio of the air volume of the preheat chamber to the cage chamber has been between 12 to 10:1. However, it has been found that maximization of growth and health of the piglets is achieved when this ratio is not allowed to exceed 8:1.

The electrical control circuitry for the system, operated from chamber 34, uses the input from the thermistor to regulate the propane and electrical heaters in conjunction with varying the speed of the fan. In the event of a failure of any component, an energy opening (not shown), on the same wall as the fan, would open upon temperature buildup and thus venting any harmful high temperature.

TABLE 1

| SUGGESTED GAS THERMOSTAT SETTINGS (Day One) | | | | | | |
|---|---|---|---|---|---|---|
| Total Weight of piglets housed per room | | Pig Room setting | | Gas Thermostate setting | | Differential |
| lbs | kgs | F° | C° | F° | C° | F° | C° |
| 1100 | 500 | 82 | 28 | 57 | 15½ | 25 | 12½ |
| 1050 | 477 | 82 | 28 | 58 | 16 | 24 | 12 |
| 1000 | 454 | 82 | 28 | 59 | 16½ | 23 | 11½ |
| 950 | 431 | 82 | 28 | 60 | 17 | 22 | 11 |
| 900 | 409 | 82 | 28 | 61 | 17½ | 21 | 10½ |
| 864 | 392 | 82 | 28 | 62 | 18 | 20 | 10 |
| 800 | 363 | 82 | 28 | 63½ | 19 | 18½ | 9 |
| 750 | 340 | 82 | 28 | 65 | 19½ | 17 | 8½ |
| 700 | 318 | 82 | 28 | 66 | 20 | 16 | 8 |
| 650 | 295 | 82 | 28 | 67 | 20½ | 15 | 7½ |
| 600 | 272 | 82 | 28 | 68 | 21 | 14 | 7 |
| 550 | 250 | 82 | 28 | 69 | 21½ | 13 | 6½ |
| 500 | 227 | 82 | 28 | 70½ | 22 | 11½ | 6 |
| 450 | 204 | 82 | 28 | 71½ | 22½ | 10½ | 5½ |
| 400 | 181 | 82 | 28 | 73 | 23½ | 9 | 4½ |
| 350 | 159 | 82 | 28 | 74 | 24 | 8 | 4 |
| 300 | 136 | 82 | 28 | 75 | 24½ | 7 | 3½ |
| 250 | 113 | 82 | 28 | 76 | 25 | 6 | 3 |

What is claimed is:

1. An animal rearing pen particularly for weaner pigs, said pen comprising:
   an elongated house including a floor, side walls, end walls and a roof,
   an air intake defined by said floor located centrally, intermediate the ends of the house for air to enter into said house, a first baffle located in the central portion, intermediate the ends of the house and located above said air intake, said first baffle communicating with said air intake and being located in the path of travel of air entering the house through the air intake for slowing down the air entering into the house and separating the incoming air into two streams, two preheat chambers located in said central portion, intermediate the ends of said house defining two first openings communicating with said first baffle through which said two air streams enter said two preheat chambers, said preheat chambers including a gas heater for raising the temperature of the air streams and an electric heater for raising the temperature of the air streams to a lesser extent than said gas heater, two second openings defined by said two preheat chambers through which air flows from said preheat chamber after passing said gas heater and said electric heater, two cage areas defined by said housing, each cage area being located between one end of the housing and one of the two preheat chambers, each of said two cage areas communicating with one of said two second openings, the volume of air in said cage area compared to the volume of air in said preheat chamber being less than 8:1, air exhaust stacks located at opposite ends of the house for exhausting air from the cage areas to the atmosphere, a third opening defined by each exhaust stack communicating with said cage areas for exhausting air from the cage areas to the exhaust stacks, second baffles each extending from each end wall of the house and projecting downwardly in front of said third opening and being spaced from said third opening, variable speed exhaust fans located in each of said exhaust stacks for pulling air from said air intake to said preheat chambers, from said preheat chambers to said cage areas and from said cage areas to said exhaust stacks in a direction along the longitudinal axis of the house, doors located in the side of said house communicating with said cage areas, and temperature sensing means mounted in said cage areas, means for controlling the temperature of each air stream, the speed of said variable speed exhaust fans and the amount of heat produced by said gas heater and said electric heater being simultaneously controlled by said means for controlling the temperature of each air stream dependent on the temperature sensed by said temperature sensing means compared to a predetermined set point.

2. An animal rearing house as claimed in claim 1, wherein the gas heater is located above said second opening and said electric heater is located on the opposite side of said second opening from said gas heater.

3. An animal rearing house as claimed in claim 1, wherein an alarm is mounted on the house and is triggered upon failure of operation of one of said variable speed exhaust fans.

4. An animal rearing house as claimed in claim 1, wherein emergency ventilation means admit air into the house in response to an increase in temperature within said house.

5. An animal rearing house as claimed in claim 1, wherein said gas heater heats the air stream to said predetermined set point and said electric heater is activated when the air temperature varies from said predetermined set point by more than 1° F.

6. An animal rearing house as claimed in claim 5, wherein said fan speed is varied by said means for controlling dependent on the difference of the air temperature from said predetermined set point.

* * * * *